(12) United States Patent
Ram

(10) Patent No.: US 9,626,373 B2
(45) Date of Patent: Apr. 18, 2017

(54) OPTIMIZING DATA BLOCK SIZE FOR DEDUPLICATION

(71) Applicant: Western Digital Technologies, Inc., Irvine, CA (US)

(72) Inventor: Tamir Ram, Sunnyvale, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 289 days.

(21) Appl. No.: 13/802,167

(22) Filed: Mar. 13, 2013

(65) Prior Publication Data

US 2014/0095439 A1   Apr. 3, 2014

Related U.S. Application Data

(60) Provisional application No. 61/708,255, filed on Oct. 1, 2012, provisional application No. 61/708,295, filed on Oct. 1, 2012.

(51) Int. Cl.
*G06F 17/30* (2006.01)
*G06F 11/14* (2006.01)

(52) U.S. Cl.
CPC .... *G06F 17/30156* (2013.01); *G06F 11/1453* (2013.01); *G06F 11/1464* (2013.01); *G06F 17/30159* (2013.01)

(58) Field of Classification Search
CPC ............. G06F 11/1451; G06F 17/3015; G06F 17/30159; G06F 17/30162; G06F 3/0641
See application file for complete search history.

(56) References Cited

U.S. PATENT DOCUMENTS

| | | | |
|---|---|---|---|
| 5,818,955 A | 10/1998 | Smithies et al. | |
| 6,091,835 A | 7/2000 | Smithies et al. | |
| 6,460,163 B1 | 10/2002 | Bowman et al. | |
| 6,757,832 B1 | 6/2004 | Silverbrook et al. | |
| 6,785,786 B1 | 8/2004 | Gold et al. | |
| 6,950,517 B2 | 9/2005 | Hawkes et al. | |
| 7,020,798 B2 | 3/2006 | Meng et al. | |
| 7,165,076 B2 | 1/2007 | Bentley | |
| 7,454,443 B2 * | 11/2008 | Ram et al. | 707/999.2 |
| 7,539,710 B1 | 5/2009 | Haustein et al. | |
| 7,558,953 B2 | 7/2009 | Osthoff et al. | |
| 7,925,683 B2 * | 4/2011 | Jain et al. | 711/162 |
| 7,996,371 B1 * | 8/2011 | Deshmukh | 707/692 |
| 8,341,117 B2 | 12/2012 | Ram et al. | |

(Continued)

FOREIGN PATENT DOCUMENTS

CN   101706825 A  *  5/2010

OTHER PUBLICATIONS

Liu, Chuanyi, Yingping Lu, Chunhui Shi, Guanlin Lu, David HC Du, and Dong-Sheng Wang. "ADMAD: Application-Driven Metadata Aware De-duplication Archival Storage System." In Storage Network Architecture and Parallel I/Os, 2008. SNAPI'08. Fifth IEEE International Workshop on, pp. 29-35. IEEE, 2008.*

(Continued)

*Primary Examiner* — Jason Liao

(57) ABSTRACT

Provided herein is technology relating to data deduplication and particularly, but not exclusively, to methods and systems for determining an efficiently optimal size of data blocks to use for backing up a data source. Also provided herein are systems for identifying duplicate data in data backup applications.

20 Claims, 3 Drawing Sheets

(56) References Cited

U.S. PATENT DOCUMENTS

| | | | |
|---|---|---|---|
| 2002/0083341 | A1 | 6/2002 | Feuerstein et al. |
| 2004/0017913 | A1 | 1/2004 | Hawkes et al. |
| 2004/0039912 | A1 | 2/2004 | Borrowman et al. |
| 2004/0098599 | A1 | 5/2004 | Bentley |
| 2004/0153935 | A1 | 8/2004 | Niesen |
| 2004/0158794 | A1 | 8/2004 | Niesen |
| 2005/0005145 | A1 | 1/2005 | Teixeira |
| 2005/0091501 | A1 | 4/2005 | Osthoff et al. |
| 2005/0235043 | A1* | 10/2005 | Teodosiu et al. ............ 709/217 |
| 2009/0150998 | A1 | 6/2009 | Adelstein et al. |
| 2009/0234870 | A1 | 9/2009 | Bates et al. |
| 2009/0265396 | A1* | 10/2009 | Ram et al. .................. 707/204 |
| 2010/0077161 | A1* | 3/2010 | Stoakes et al. ............... 711/162 |
| 2010/0198797 | A1 | 8/2010 | Wideman |
| 2011/0125722 | A1 | 5/2011 | Rao et al. |
| 2011/0276543 | A1 | 11/2011 | Matze |
| 2012/0084527 | A1 | 4/2012 | Jayaraman et al. |
| 2012/0158672 | A1 | 6/2012 | Oltean et al. |
| 2013/0046733 | A1* | 2/2013 | Sakuraba et al. ............ 707/640 |

OTHER PUBLICATIONS

Fu, Yinjin, Hong Jiang, Nong Xiao, Lei Tian, and Fang Liu. "AA-Dedupe: An application-aware source deduplication approach for cloud backup services in the personal computing environment." In Cluster Computing (CLUSTER), 2011 IEEE International Conference on, pp. 112-120. IEEE, 2011.*

Mudrankit, Amar. "A Context Aware Block Layer: The Case for Block Layer Deduplication." PhD diss., Stony Brook University, 2012.*

Min, Jaehong, Daeyoung Yoon, and Youjip Won. "Efficient deduplication techniques for modern backup operation." Computers, IEEE Transactions on 60, No. 6 (2011): 824-840.*

Arkeia software announces arkeia network backup version 9.0. (Oct. 19, 2010). PR Newswire Retrieved from http://search.proquest.com/professional/docview/759391511?accountid=142257.*

Arkeia software acquires kadena systems for patented next-generation data deduplication. (Nov. 3, 2009). PR Newswire Retrieved from http://search.proquest.com/professional/docview/677932515?accountid=142257.*

Whitehouse, Lauren. "The State of Backup Dedupe". Storage. vol. 10, No. 6, Aug. 2011, p. 18.*

The Internet Archive, at https://web.archive.org/web/20060517011700/http://stat.ethz.ch/R-manual/R-patched/library/stats/html/approxfun.html (retrieved Jan. 8, 2014 providing evidence of a website at http://stat.ethz.ch/R-manual/R-patched/library/stats/html/approxfun.html captured May 17, 2006).*

Smith, Mark A., Jan Pieper, Daniel Gruhl, and Lucas Villa Real. "IZO: Applications of Large-Window Compression to Virtual Machine Management." In LISA, pp. 121-132. 2008.*

EMC Glossary. "Data Deduplication Rate". Archived on the Internet Archive on Sep. 20, 2012 and downloaded Aug. 27, 2015. https://web.archive.org/web/20120917120121/http://www.emc.com/corporate/glossary/data-deduplication-rate.htm.*

Pclogic, Next Gen. Dedup.—Arkeia with Kadena Systems Jul. 5, 2011, youtube, https://www.youtube.com/watch?v=Xaw2JMaSUtE.*

Kadena Acquisition FAQ [date unknown], Cyber Intelligent Security, http://cyberintelligentsecurity.net/arkeia/products/progressive-deduplication.php.*

Juan Piernas et al.,"DualFS: a New Journaling File System without Meta-Data Duplication", In Proceedings of the 16th International Conf. on Supercomputing (ICS' 02), ACM, NY,(2002), pp. 10.

Rivest et al.,"The MD5 Message-Digest Algorithm" Network Working Group, Request for Comments: 1321, MIT Laboratory for Computer Science & RSA Data Securtiy, Inc. (1992), pp. 20.

International Search Report and Written Opinion dated Jan. 22, 2014 for related PCT Application No. PCT/US2013/062736, pp. 10.

Supplementary European Search Report for European Application No. 13844178, mailed May 9, 2016.

\* cited by examiner

OPTIMIZING DATA BLOCK SIZE FOR DEDUPLICATION

The present application claims priority to U.S. Provisional Patent Application Ser. Nos. 61/708,255, filed Oct. 1, 2012, and 61/708,295, filed Oct. 1, 2012, the disclosures of which are herein incorporated by reference in their entireties.

BACKGROUND

Data deduplication is a data compression technology that reduces data volume by identifying and eliminating redundant data. The first deduplication technologies for "single-instance storage" were based on file-grain deduplication. In file-grain deduplication, duplicate copies of the same file, whether or not having the same name, were detected based on content and only one copy of the file was stored on disk. However, file-grain technologies suffered from inefficiencies related to comparing data at such a course level: for example, if a single word was added to a document, single-instance storage would not recognize any data redundancies and would store the entire file as a "new" file.

One method for reducing the amount of network bandwidth and computer storage required for data deduplication is to divide individual files into blocks, identify duplicate data blocks, and only transfer and store a single instance of a duplicated data block. One method for dividing files (or other data sources such as complete filesystems) into blocks involves using fixed-size blocks. When generating data blocks, dividing a file into smaller blocks provides the potential benefit of generating more duplicate blocks, thus making the replicated data smaller when removing and accounting for the duplication. On the other hand, dividing files into larger blocks has the benefit of requiring less indexing and fewer block comparisons, making the block index smaller and the associated processing and memory overhead smaller for the replicated data.

The early technologies based on file-grain deduplication have largely disappeared in favor of block-grain deduplication, in which a file is treated as a collection of multiple data blocks. Block-grain deduplication operates within files and stores only unique or newly-created blocks. In operation, each block of a file is compared to known blocks. If a block has been previously stored, the block is simply referenced rather than stored again. Each block, stored only once, is compressed using other encoding technologies. Accordingly, block-grain deduplication delivers greater compression ratios than single-instance storage.

The first block-grain technologies used fixed-block deduplication in which the block size was preset to a constant value. While fixed-block deduplication was an improvement over file-grain deduplication, fixed-block deduplication fails to tolerate the insertion of data at the beginning or in the middle of a file. That is, when data is inserted in a file, fixed-block deduplication will detect all subsequent blocks as new blocks, thus resulting in a lower deduplication compression ratio. In such a scenario, fixed-block deduplication suffers from inefficiencies approaching those associated with file-grain deduplication technologies.

Variable-block deduplication technologies addressed the problems of data insertion inherent in fixed-block technologies, but at the cost of incurring additional processing. Variable-block deduplication sets block boundaries by identifying particular markers (so-called "magic numbers") within the file's data. While variable-block deduplication technologies improved compression ratios, performance was slowed due to the increased overhead associated with identifying the block boundaries.

SUMMARY

Accordingly, provided herein are technologies for improving data deduplication by determining the optimal block sizes for particular types of files. For example, embodiments of the technology find use in methods for determining an optimal data block size for a file type in which the methods comprise constructing a function relating a plurality of compression ratios to a plurality of test data block sizes, wherein a compression ratio of the plurality of compression ratios is calculated by transforming a file of the file type using a deduplication technology and a test data block size of the plurality of test data block sizes; determining a maximum compression ratio of the function; and choosing a test data block size associated with the maximum compression ratio to be the optimal data block size for the file type. In some embodiments, methods are further provided wherein constructing the function relating a plurality of compression ratios to a plurality of test data block sizes further comprises providing a file of the file type, wherein the file has a file size; generating a plurality of data blocks from the file, wherein each data block of the plurality of data blocks has a size that is the test data block size; applying the deduplication technology to the plurality of data blocks to produce a deduplicated result file, wherein the deduplicated result file has a deduplicated result file size; and calculating a compression ratio from the file size and the deduplicated result file size.

In some embodiments, files are first grouped according to type, and thus in some embodiments the file is selected from a collection of files of the same file type and the function is constructed using one or more, most, or all files from the collection of files of the same file type. Various techniques may be used to define the file type of a file. In some embodiments, the file type of a file is determined by analyzing the file contents. For instance, in some embodiments the file comprises a plurality of data bytes and the file type is determined by examining a data byte from the plurality of data bytes and in some embodiments the file has an extension and the file type is determined from the extension. File types include, but are not limited to, those in Table 1.

TABLE 1

| | |
|---|---|
| application/excel | image/gif |
| application/msaccess | image/jp2 |
| application/msword | image/jpeg |
| application/octet-stream | image/png |
| application/pdf | image/tiff |
| application/pgp | text/fortran |
| application/postscript | text/html |
| application/x-awk | text/plain |
| application/x-compress | text/rtf |
| application/x-dbm | text/troff |
| application/x-dosexec | text/x-asm |
| application/x-font-ttf | text/x-c |
| application/x-gnupg-keyring | text/x-c++ |
| application/x-gzip | text/x-diff |
| application/x-hwp | text/x-fortran |
| application/x-iso9660 | text/x-java |
| application/xml | text/x-lisp |
| application/x-msaccess | text/x-m4; charset = us-ascii |
| application/x-nawk | text/x-mail |
| application/x-perl | text/x-makefile |
| application/x-rar | text/x-msdos-batch |
| application/x-rpm | text/x-news |
| application/x-sharedlib | text/x-pascal |
| application/x-shellscript | text/x-po |

TABLE 1-continued

| | |
|---|---|
| application/x-shockwave-flash | text/x-shellscript |
| application/x-tar | video/mp4 |
| application/zip | video/quicktime |
| audio/mpeg | video/x-ms-asf |
| audio/x-wav | video/x-msvideo |

In some instances, the file type is a file that is an application, executable, image, text file, source code, audio, video, database, spreadsheet, word processing document, system file, directory, disk image, archive, portable document, binary file, vector image, font, computer aided design, compressed, physical recordable media archiving, electronic design automation, desktop publishing, document, geographic information system, graphical information organizer, color palette, raster graphics, 3D graphics, mathematical, object code, shared library, dynamic linked library, page description, personal information manager, presentation, project management, reference management, scientific data, script, game, virtual machine, man file, webpage, markup language, and/or financial record.

Additionally, some embodiments of the technology provide methods in which the file has a resource fork and the file type is determined from the resource fork and methods in which the file has metadata and the file type is determined from the metadata.

The function provides a relation between the plurality of compression ratios and the plurality of test data block sizes. In some embodiments, the function is a model relating the plurality of compression ratios to the plurality of test data block sizes and in some embodiments the function is an interpolation based on the plurality of compression ratios and the plurality of test data block sizes.

Also provided herein are technologies related to data backup systems. For example, in some embodiments the technology provides a data backup system comprising a table relating a plurality of file types to a plurality of optimal data block sizes; a deduplication technology; a functionality to receive a data source having a file type; and a processor configured to generate a plurality of data blocks from the data source, wherein each data block of the plurality of data blocks has a size that is the optimal data block size associated with the file type. The table can either be pre-constructed and supplied to the system or constructed by the system itself. Thus, embodiments provide systems further comprising a functionality to construct the table, for example through the use of an embodiment of a method as discussed above. The systems are not limited in the sources or types of data that can be backed up. For example, embodiments provide data backup systems wherein the data source is a file, a filesystem, or a plurality of files.

The data to be backed up can reside on one computer, machine, network node, storage device, etc. or can reside on multiple computers, machines, network nodes, storage devices, etc. As such, some embodiments provide that the plurality of files resides on a plurality of computers, machines, network nodes, storage devices, etc. Moreover, the backup systems provide for the backup of a local data source to a remote backup site. Thus, in some embodiments, the data backup system is local to the data source. Such an arrangement gains efficiency by transferring the deduplicated, smaller data to the backup site rather than transferring the full data set containing redundancies to the backup site. However, in some embodiments it is desirable to perform deduplication at the remote backup location and, thus, in some embodiments the data backup system is remote from the data source. Additionally, as individual computers often have similar installations of operating systems, filesystems, software suites, and other generic software (e.g., Unix, Linux, OpenOffice, iWork, iLife, Microsoft Windows, Microsoft Office, Adobe Creative Suite, Mac OS X, GNOME, etc.), efficiency gains can be realized by generating and pre-populating the backup with data blocks from such generic files found within the collection of data sources (e.g., files, computers, storage media) to be backed up. Accordingly, in some embodiments the systems further comprise a pre-populated plurality of data blocks generated from standard files, e.g., from an operating system or filesystem. Additional embodiments will be apparent to persons skilled in the relevant art based on the teachings contained herein.

Further provided herein is technology relating to managing electronic data and particularly, but not exclusively, to methods and systems for identifying duplicate data in data deduplication applications. Like fixed-block deduplication, the data deduplication technology provided uses a fixed block size. However, unlike conventional fixed-block methods, the present technology varies the boundaries of each data block by sliding a window through the data source to test each possible starting point for the block. In some embodiments the block size may vary by data source to provide the most efficient deduplication for the particular data source that is subject to deduplication. A rolling checksum (e.g., similar to that used in rsync, see, e.g., Tridgell, A. "Efficient Algorithms for Sorting and Synchronization", Ph.D. thesis, The Australian National University, 1999), which uses minimal processor resources, may be used to identify blocks within the window that may be duplicates. Then, a more processor-intensive process uses a hash calculation to confirm duplicate blocks from the possible candidates.

For instance, in some embodiments the technology provides methods for determining a boundary of a data block from a data source, the method comprising generating a data block from a data source, wherein the data block has a beginning byte A, an end byte B, and a size S; comparing the data block to a collection of stored data blocks; setting the boundary of the data block to be the end byte B if the data block matched a stored data block; and changing the beginning byte A and the end byte B by a delta Z if the data block did not match any stored data block. The size S of the data block is set by the user or by the deduplication software by any appropriate means. For instance, in some embodiments the size S is determined by a file type, e.g., by consulting a table of data block sizes empirically or theoretically determined to be optimal for the particular file type (e.g., a text file, a bitmap image, a database, a music file, an executable, etc.). In some embodiments, the size S is determined by examining the data source (e.g., by examining the content of the data source, e.g., by examining a byte of the data source or by examining more than a byte of the data source). In some embodiments, S is selected by the user to provide a desired balance between speed and storage efficiency.

Embodiments of the technology provide a sliding block progressive deduplication manipulation of data wherein, in one aspect, the sliding block slides toward the end of the data source and in some embodiments the sliding block slides toward the beginning of the data source. Accordingly, in some embodiments, the delta Z is positive and in some embodiments the delta Z is negative. For example, in some embodiments the delta Z is +1 and in some embodiments the delta Z is −1.

In some embodiments, the boundary of a data block is (S+Z) bytes from the boundary of the previous data block, e.g., a boundary B(n) of an nth data block is (S+Z) bytes from a boundary B(n−1) of an (n−1)th data block. In some embodiments, when the sliding block has moved through the entire previous data block without a match in the collection of known data blocks, then the boundary of the present data block is S bytes from the boundary of the previous data block, e.g., a boundary B(n) of an nth data block is S bytes from a boundary B(n−1) of an (n−1)th data block if S equals the absolute value of Z. In some embodiments, the boundary of a data block is the last byte of the data source. In some embodiments, the boundary of the first data block is S bytes from the beginning of the data source, e.g., a boundary B(1) of a first data block is at a byte S. In some embodiments, boundaries of data blocks after the first data block are set using this sliding block method, e.g., by repeating the generating, comparing, setting, and incrementing steps until the end of the data block is at or beyond a last byte of the data source.

The method is not limited in the data that is the data source, e.g., with respect to the type, size, complexity, etc. of the data. For example, in some embodiments, the data source comprises a file, in some embodiments, the data source comprises a collection of files (e.g., that are similar, e.g., having the same file type, or that are dissimilar, e.g., having a different file type) and in some embodiments the data source comprises a filesystem.

Various methods for comparing data blocks are used in embodiments of the methods provided herein. In some embodiments, message digests computed from the data blocks are used for comparison. Accordingly, in some embodiments the comparing step comprises computing a first message digest of the data block using a function; computing a second message digest of a data block from the collection of data blocks using the function; and comparing the first message digest with the second message digest. Embodiments comprise use of many functions to generate the message digests, e.g., in some embodiments the function comprises calculating a rolling hash, in some embodiments the function comprises calculating a checksum, and in some embodiments the function comprises calculating a Rabin hash.

In some embodiments, e.g., embodiments that find use in a data backup system in which backup data is transmitted through a network, data deduplication is performed on the data before transmission of the deduplicated data to the backup storage (e.g., target volume). As such, in some embodiments the method is performed local to the data source. In some embodiments the data deduplication is performed on the data after it is transmitted to the backup storage. Thus, in some embodiments, the method is performed remote from the data source. Embodiments that find use in a backup system comprise methods wherein the data block is a new data block if the data block did not match any data block from the collection of data blocks or the data block is a known data block if the data block matched any data block from the collection of data blocks. In some embodiments a new data block is stored in a backup; in some embodiments a pointer of a known data block is stored in a backup.

Also provided herein are embodiments of the technology that find use in systems for determining a boundary of a data block from a data source, the system comprising a processor configured to: generate a data block from a data source, wherein the data block has a beginning byte A, an end byte B, and a size S; compare the data block to a collection of stored data blocks; set the boundary of the data block to be the end byte B if the data block matched a stored data block; and change the beginning byte A and the end byte B by a delta Z if the data block did not match any stored data block. In some embodiments, the system further comprises a target volume, a source volume comprising the data source, and a functionality for transmitting data from the source volume to the target volume. Said embodiments of systems find use in data backup applications wherein data is deduplicated. Accordingly, in some embodiments, the data transmitted from the data source to the target volume is a data block or a pointer to a data block. In some embodiments, the systems further comprise a data compression functionality.

In some embodiments, e.g., embodiments that find use in a data backup system in which backup data is transmitted through a network, data deduplication is performed on the data before transmission of the deduplicated data to the backup storage (e.g., target volume). Accordingly, in some embodiments the processor is local to the data source. In some backup systems the data duplication occurs after the transmission of the data and thus and in some embodiments the processor is remote from the data source. The embodiments find use in network backup systems, for example, in some embodiments the target volume and the source volume are connected by a LAN and in some embodiments the target volume and the source volume are connected by a WAN. In some embodiments, the system is configured to use a data block size that is optimized for the type of data that is being deduplicated. For example, in some embodiments the system further comprises a table relating a plurality of file types to a plurality of optimal data block sizes. In general, provided herein are embodiments of systems comprising a processor configured to perform a method described as above for determining the boundary of a data block, that finds use, e.g., in a backup system or other application in which data is deduplicated. Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

DETAILED DESCRIPTION

Figure 1:
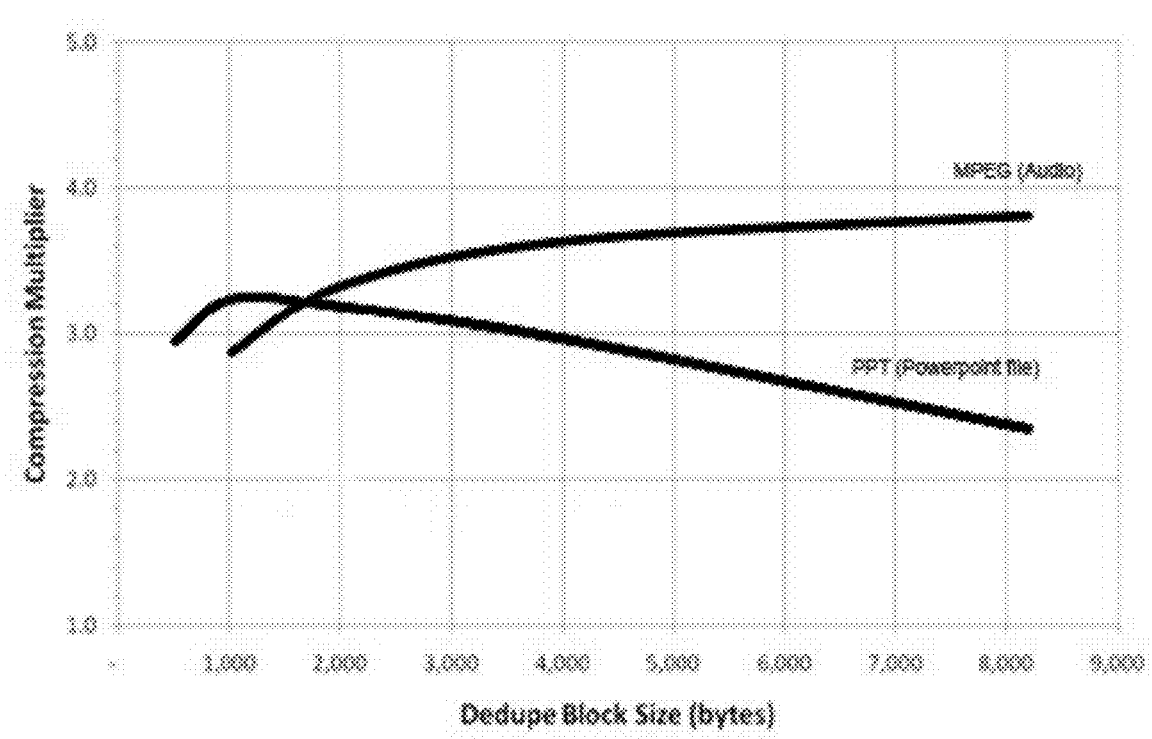
FIG. 1 is a plot showing the relationship between the compression ratio and block size for two file types (an audio file of type MPEG and a slide presentation file of type PPT).

Provided herein is technology relating to data deduplication and particularly, but not exclusively, to methods and systems for determining an efficiently optimal size of data blocks to use for backing up a data source. Also provided herein are systems for identifying duplicate data in data backup applications.

DEFINITIONS

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or", unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the term "computer" shall mean a machine comprising a processor, a memory, and an operating system, capable of interaction with a user or other computer, and shall include without limitation desktop computers, notebook computers, laptop computers, servers, personal digital assistants (PDAs), tablet computers, handheld computers, smart phones, and similar devices that store data.

As used herein, the term "local" describes a relationship between two or more computing devices wherein the devices are physically located in a small geographic area, such as a home, office, or a building, and communicate with each other over a local area network or without using a network, such as by wired or wireless mechanisms. The term "remote" describes a relationship that is not local, such as communication over a wide area network, global network, or combinations thereof.

As used herein, the term "compression ratio" refers to a ratio of data before deduplication to the amount of data after deduplication. A higher deduplication ratio corresponds to a higher amount of data reduction.

As used herein, the terms "processor" and "central processing unit" or "CPU" are used interchangeably and refer to a device that is able to read a program from a computer memory (e.g., ROM or other computer memory) and perform a set of steps according to the program.

As used herein, the term "client-server" refers to a model of interaction in a distributed computing system in which a program at one site sends a request to a program at another site and waits for a response. The requesting program is called the "client" and the program that responds to the request is called the "server". For example, in the context of the World Wide Web, the client is a "web browser" (or simply "browser") that runs on a computer of a user; the program which responds to browser requests by serving content is commonly referred to as a "web server".

As used herein, the term "deduplication" refers to the elimination of redundant data in a data source. In the deduplication process, duplicate data is sometimes deleted and sometimes retained but not transferred or stored, typically leaving only one copy of the data to be stored. However, in some embodiments, indexing of all data is still retained should that data ever be required. In some embodiments, deduplication improves storage utilization and reduces the number of bytes that is transmitted across a link in a network. In some embodiments of deduplication, chunks of data, e.g., "data blocks" or byte patterns, are generated and stored. As the process continues, other data blocks are compared to the stored copies. When a match occurs, the redundant data block is replaced with a small reference that points to the previously stored data block. Data blocks having the same byte pattern may occur dozens, hundreds, or even thousands of times (the match frequency is a factor of the data block size); thus, the amount data that is stored or transferred can be greatly reduced. The stored data is often referred to by the term "replicated" data.

As used herein, the term "file" is used to refer to an entity of digital data. In general, a "file" includes data (such as meta-tags or other meta-data) that is contained in a header of the file and which defines attributes of the contents of the file. A "file" also includes the content (e.g., a video, a piece of music such as a song, software, executable code, an image, a word processing document, a spreadsheet, or the like). The content may be in the clear or it may be encrypted or otherwise encoded. Typically, as used herein, a "file" is identified by a filename. Each file has a size. Each file also has a file type, which is sometimes associated with a file extension. For example, a file containing the data of a video may be formatted as an MPEG file (sometimes indicated by an .mpg file extension) or in any other file format allowing the play of video images. A plain text file may be formatted as an ASCII text file (sometimes indicated by a .txt file extension). A file may also be compressed (e.g., using any available file compression algorithm such as ZIP or the like) or otherwise encoded.

In some systems a same file name may simultaneously reference a plurality of logically parallel "forks" such as a "data fork" and a "resource fork". The "data fork" contains what is routinely considered by users to be the file's data while the "resource fork" contains system-related information that is used by the operating system to process the contents of the "data fork".

As used herein, the term "metadata" is used to refer to data that describes, at least in part, other data, which may be of any type.

As used herein, a "model" is a mathematical equation that fits a data set. The model provides for approximating values between experimental data points and using the values to facilitate curve-fitting of the data. The equation may be determined based on the experimentally manifested characteristics of the data or based on predictions of the relationships between the variables represented by the data set.

As used herein, the term "kilobyte" (SI symbol, kB) refers to a multiple of the unit "byte" for digital information. Although the prefix "kilo" means 1000, the term kilobyte and symbol kB may refer both to 1024 ($2^{10}$) bytes and/or 1000 ($10^3$) bytes, dependent upon context. In some contexts, "kibibyte" (symbol: KiB) is used to denote $2^{10}$ or 1024 bytes exclusively.

As used herein, a "hash function" refers to a deterministic procedure that takes an arbitrary data block and returns a fixed-size bit string such that a change to the data block will change the hash value. The data to be encoded is often called the "message" and the hash value is sometimes called the "message digest" or simply the "digest".

As used herein, the term "volume" may refer to any defined amount of storage on one or more data storage devices such as a hard disk, solid state drive, flash memory, virtual drive, etc). In addition to its size and the storage device or device on which it is allocated, a volume may, in some cases, have other attributes (e.g., protection and/or performance features such as mirroring, striping, RAID level, spanning, concatenation, etc.). The term volume comprises, for example, logical volumes as used in Unix and Unix-type operating systems such as Linux, AIX, Solaris, Mac OS X, etc. The term volume may also include, for example, a volume as defined by volume manager software. The term volume may further include a partition as used, e.g., by Microsoft Windows and/or DOS. A partition may be a division of storage on a single physical disk drive or other medium in which data are stored, isolating the partitioned storage from other storage on the disk drive. Partitions may be primary or extended. The term volume may further refer to volume groups.

As used herein, the "source" and "target" may each comprise a computer system capable of hosting one or more storage devices (such as disks or volumes). For example, a source or a target may be a server computer system, including one or more processors, one or more system memories, and one or more disks or other storage devices, where the server system is configured to execute software such as one or more operating systems. In another embodiment, a source or a target may be a client computer system such as a single-user workstation.

As used herein, a "Rabin algorithm" or "Rabin-Karp" algorithm or "Rabin hash" refers to a string search method developed by Michael O. Rabin and Richard M. Karp, e.g., as described in Cormen, T H; Leiserson, C E; Rivest, R L; and Stein, C. "The Rabin-Karp algorithm" in *Introduction to Algorithms* (2nd ed.), Cambridge, Mass. (MIT Press 2001), pp. 911-916, incorporated herein by reference in its entirety for all purposes.

Embodiments of the Technology

In general, the technology relates to methods for reducing the amount of bandwidth and storage space required to backup computer files as a means to optimize the efficiency of computer backup systems. One application of the technology finds use in determining the optimal block size for different types of files (e.g., a text file, an Adobe portable document file (PDF), an audio file, etc. See, e.g., Table 1). Once determined, subsequent backups use the predetermined optimal block size when the associated type of file is deduplicated and backed up by a backup system.

In one embodiment of such a method, files from a backup source are first grouped according to file type. The file type can be determined from the file's filename extension (e.g., .txt, .pdf, .mp3, etc.) or by examining the content (e.g., the first or other bytes) of the file. Then, a set of files from a file type group is chosen pseudo-randomly or randomly and the system's particular block deduplication technology is applied to this group of files using a sequence of different block sizes. For instance, this sequence might use block sizes of 1 kB, 2 kB, 4 kB, etc., or, e.g., block sizes of $2^{10}$, $2^{11}$, ... $2^{20}$ bytes. The resulting deduplicated ("replicated") data is examined for size, including the size of the index constructed for the data blocks and any other metadata generated by the method. Next, a compression ratio is calculated based on the size of the original data relative to (e.g., divided by) the size of the replicated data. Finally, the block size that yields the largest compression ratio is chosen as the optimal block size for that file type, e.g., by analyzing the curve shape to identify the maximum compression rate (e.g., see FIG. 1 for files of type PPT where the optimum is approximately 1.2 kB). If compression does not begin to decrease as block size is increased, in other words there is no local maximum in the curve plotting the compression ratio versus block size, the conclusion is that files of that type should not be divided into blocks, but rather treated as whole files (e.g., see FIG. 1 for files of type MPEG). In the case that the compression rate is found at the maximum block size tested and analysis suggests that higher compression rates will be attained at a larger block size, some embodiments then estimate that the largest possible block size (e.g., $2^{30}$) will, in effect, offer the maximum compression rate.

Once files of various types are tested according to this method, the resulting information is applied to new data sources and installations of deduplication software. For any given installation on a particular computer or network, file types are determined wherever possible and the calculated optimal block sizes are used for files of that type. This is applicable to entire filesystems treated as a single file and in installations where the deduplication software does not have knowledge of individual files. Otherwise, if a file's type cannot be determined, a generic block size chosen for that type of installation is used.

In addition to optimizing block size, new installations of deduplication software are prepopulated with data blocks corresponding to the generic files for that computer and installation. These include operating system files or anything else included as a standard part of a computer installation on a particular network (e.g., Unix (including, e.g., BSD, GNU, and other official or non-official variants), Linux, Solaris, OpenOffice, iWork, iLife, Microsoft Windows, Microsoft Office, Adobe Creative Suite, Mac OS X, GNOME, etc., including, for example, device drivers, kernel files, development environments (e.g., a compiler), documentation (e.g., man pages, help systems), shells, text editors, applications, etc.). With pre-population of data blocks, initial runs of deduplication software are much faster and use the same set of data blocks across an installation. According to this method, a machine to be replicated for a particular network is first run through deduplication software and then replicated to other machines, with metadata intact.

The technology is applicable to files of any type, for instance, but not limited to, files having the types listed in Table 1. In some embodiments, the technology is applied to, e.g., entire filesystems, collections of files, or other data entities. The block size optimization technology, e.g., as embodied in the methods provided herein, is applicable to any type of data regardless of type, size, structure, etc.

In some embodiments, the technology finds use in association with a deduplication technology. In some embodiments, the deduplication used is source deduplication (e.g., deduplication occurs where data is created) and in some embodiments the deduplication is target deduplication (e.g., deduplication occurs where the data is stored). The deduplication technologies that find use in association with embodiments of the technology include any suitable fixed-block deduplication technology known in the art, including any fixed-block deduplication technology that is to be developed in the art in the future.

For example, one type of data deduplication comprises comparing blocks of data to detect duplicates. For comparisons, each data block is assigned an identifier (e.g., a message digest) calculated by the backup software, e.g., using a cryptographic hash function (e.g., AES, SHA-0, SHA-1, SHA-2, SHA-3, MD2, MD4, MD5, Skein, BLAKE, JH, Keccak, RadioGatún, COST, HAVAL, PANAMA, Tiger, WHIRLPOOL, RIPEMD, etc.). In some embodiments, a rolling hash is used. Some embodiments assume that if the identifiers are identical then the data is identical. Other embodiments do not assume that two blocks of data with the same identifier are identical, but actually verify that data blocks with the same identifier are identical. In either type of implementation, if the software detects that a given data block already exists, then it replaces that duplicate data block with a link, pointer, handle, or other type of reference to the previously stored data block. Once the data has been deduplicated, upon read back of the file, wherever a link, pointer, handle, or other type of reference to the previously stored data block is found, the system simply replaces the reference with the referenced data block.

Client backup deduplication is the process where the deduplication hash calculations are initially created on the source (client) machines. Files that have identical hashes to files already in the target device are not sent to the target and the target device creates appropriate internal references to the duplicated data. The benefit is avoiding transmission of redundant data across the network and thus reducing network traffic.

In some embodiments, deduplication is used with secondary storage systems, e.g., storage systems for primarily duplicate copies of data that are typically not used for actual production operations and thus exchange performance degradation for increased efficiency. Is some embodiments, deduplication finds use with primary storage when the backup system does not require significant overhead or impact performance.

Replicating data from one computer system to another can be accomplished more efficiently by recognizing duplication within the data, and transferring duplicate data only once. This results in a savings of network bandwidth when transferring data between systems and results in a savings of computer storage for the replicated data. Computer files, or a filesystem image, are divided into blocks of a predetermined size and compared for deduplication. In some embodiments, the methods are used for determining how to divide files or filesystems into blocks to recognize duplication in a way that maximizes compression ratios and efficiencies of computation.

Provided herein is technology relating to managing electronic data and particularly, but not exclusively, to methods and systems for identifying duplicate data in data backup and data deduplicating applications.

For instance, provided herein are embodiments of methods related to progressive deduplication, which is an alternative to conventional fixed-block and variable-block deduplication. As with variable-block deduplication, in some embodiments the block size can be adjusted for optimal deduplication ratios. Thus, in some embodiments, because the size of the sliding window is adjustable, block sizes are tailored to particular types of files and data sources (e.g., based on file type or data content). These implementations permit progressive deduplication to be "content aware" (also known as "application aware"). In some embodiments, maximum compression rates are achieved by using different block sizes for different types of data (e.g., such as executable files, text files, and database records), for example as described above.

Figure 2:
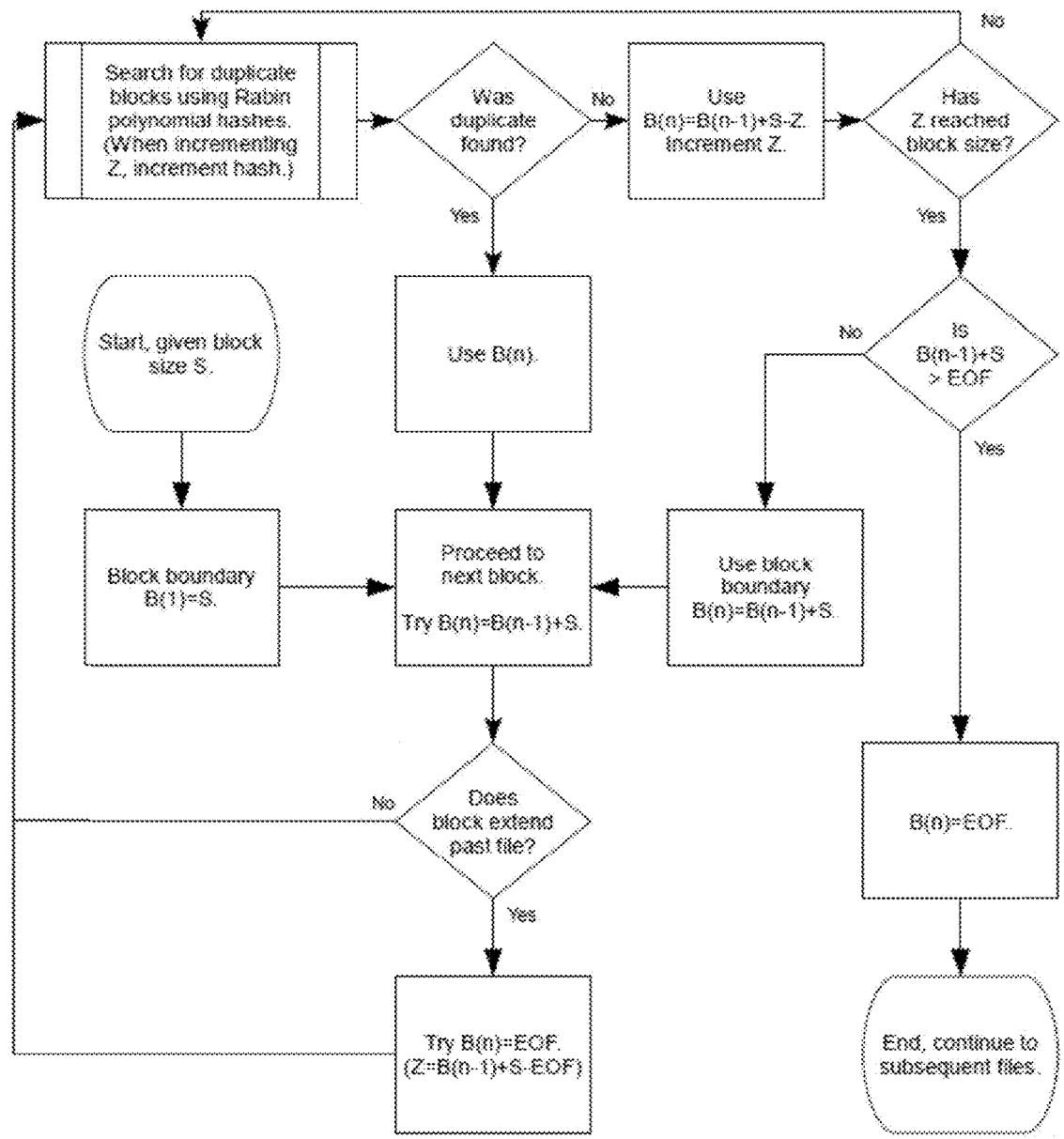
FIG. 2 is a flowchart describing an embodiment of a block boundary determining technology as provided herein.

In some aspects, embodiments of the progressive deduplication technology provide methods for identifying the boundaries of data blocks. For instance, in one embodiment shown in FIG. 2, the first block of each file or filesystem is determined by the fixed block size chosen (S). The end of each block is called the block boundary, and so the first block has its boundary $B(1)=S$. Subsequent block boundaries are determined by first comparing the next S bytes to the set of known blocks for deduplication, so that $B(n)=B(n-1)+S$. If no duplicate is found, a sequence of different block boundaries is compared, starting with $B(n)=B(n-1)+S-1$ and sliding backward. The resulting block of size S is compared to the set of known blocks for deduplication. If a duplicate is found, $B(n)$ is now determined. If no duplicate is found, the next byte is checked so that $B(n)$ is decremented by 1. If a duplicate is found Z bytes (with $Z<S$) into the previous block, then $B(n)=B(n-1)+S-Z$ If no duplicate is found, and Z reaches S, then $B(n)=B(n-1)+S$. $B(n+1)$ is determined next in the same manner. If at any time in this process, $B(n-1)+S$ is greater than the length of the file, $B(n)$ starts instead with the end of the file and is checked and decremented as above. Once the end of a file or filesystem is reached, the method is applied to any subsequent files or filesystems in need of replication.

When comparing blocks or prospective blocks for duplication, a polynomial hash is computed, e.g., according to the Rabin algorithm. The polynomial hash for the block to be compared is checked against a set of hashes for known blocks. To compare a sequence of blocks efficiently, when stepping by bytes as in the previous paragraph, polynomial hashes are changed incrementally. The portion of the hash polynomial corresponding to the byte $B(n-1)-Z$ is added and the portion corresponding to the byte $B(n-1)+S-Z+1$ is subtracted. The contribution of the other $S-1$ bytes to the hash polynomial is not recalculated, but is shifted higher in degree.

Figure 3:
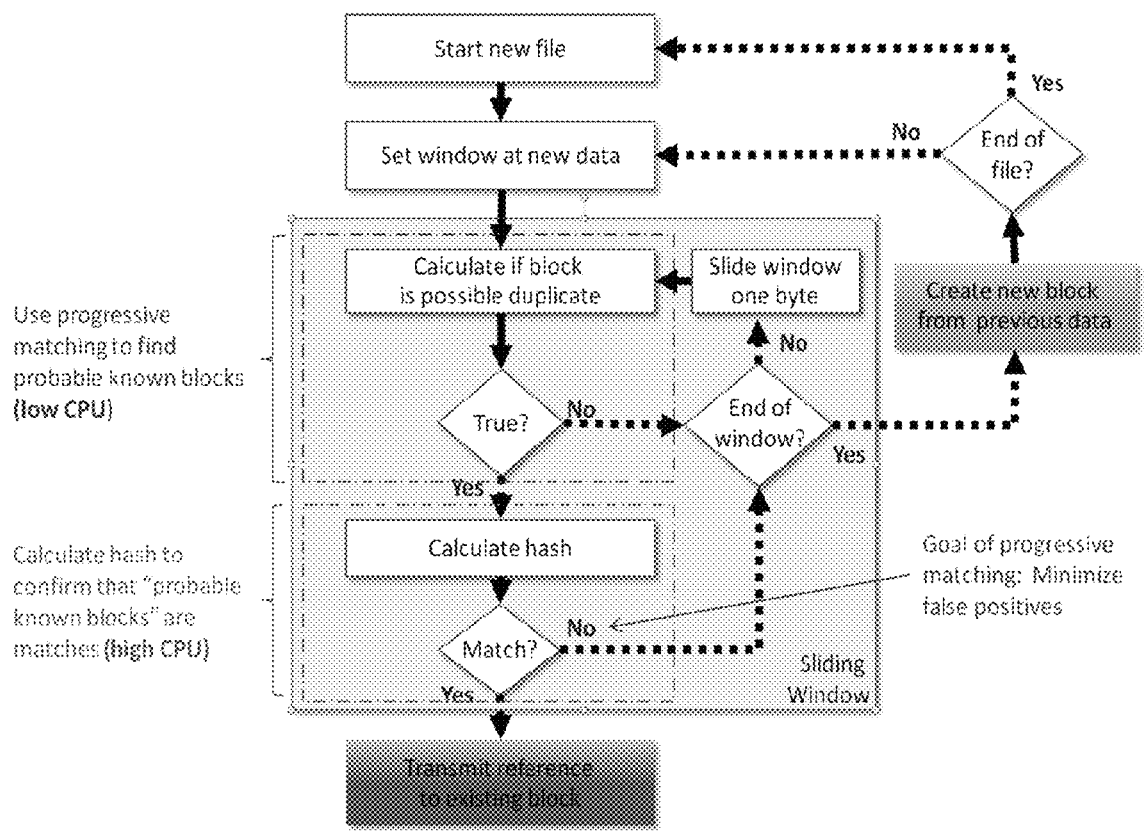
FIG. 3 is a flowchart describing an embodiment of a slide-forward method according to the technology provided herein.

An alternate method proceeds by checking the next contiguous block for duplication as before; but, if no duplicate is found, then instead of sliding backward from the end of the previous block, the method starts at the beginning of the previous block and slides forward one byte at a time, looking for duplicate blocks. As described previously, a polynomial hash is computed to compare blocks or prospective blocks for deduplication. The polynomial hash is moved a byte at a time without being fully recalculated, but in this alternative the lowest ordered terms are dropped, higher order terms are added, and the others are shifted downward. See, e.g., FIG. 3.

In some embodiments, the method is used by sliding by an interval different than one byte, depending on the type of file or other conditions of the computer installation. The same methods as described above can be carried out by moving a single bit, or multiple bytes, or any other interval (a nibble, a word, etc.).

In some embodiments, the technology is applied, e.g., to entire filesystems or other data entities. The block deduplication technology, e.g., as embodied in the methods provided herein, is applicable to any type of data (e.g., regardless of type or size).

In some embodiments, the deduplication used is source deduplication (e.g., deduplication occurs close to where data is created) and in some embodiments the deduplication is target deduplication (e.g., deduplication occurs near where the data is stored). Source-side deduplication happens at the backup client before data is transferred over the network. Using a cached record of blocks on the backup server, the backup agent determines if the backup server already has a copy of the specific block of data found on the client. If so, the agent does not transfer the duplicate block across the network. With target-side deduplication, all blocks are transferred to the target before duplicate blocks are discarded. By significantly reducing the amount of data being transferred over the network, source-side deduplication enables faster network backups without requiring any additional network investments. Source-side deduplication makes backups in distributed environments feasible by drastically reducing the amount of data that is sent over the network. By combining source-side deduplication with replication, enterprises have the ability to move data efficiently between sites for disaster recovery or redundant off-site storage. In addition, source-side deduplication allows enterprises to implement a solution that expands storage capacity and network bandwidth capacity, without the costs of upgrading storage or network infrastructure.

In some embodiments, data deduplication comprises comparing blocks of data to detect duplicates. For comparisons, each data block is assigned an identifier (e.g., a message digest) calculated by the backup software, e.g., using a cryptographic hash function (e.g., AES, SHA-0, SHA-1, SHA-2, SHA-3, MD2, MD4, MD5, Skein, BLAKE, JH, Keccak, RadioGatún, COST, HAVAL, PANAMA, Tiger, WHIRLPOOL, RIPEMD, etc.). In some embodiments, a Rabin algorithm is used.

Some embodiments assume that if the identifiers are identical then the data is identical. Other embodiments do not assume that two blocks of data with the same identifier are identical, but actually verify that data blocks with the same identifier are identical. In either type of implementation, if the software detects that a given data block already exists, then it will replace that duplicate data block with a link, pointer, handle, or other type of reference to the previously stored data block. Once the data has been deduplicated, upon read back of the file, wherever a link, pointer, handle, or other type of reference to the previously stored data block is found, the system simply replaces the reference with the referenced data block.

Client backup deduplication is the process where the deduplication hash calculations are initially created on the source (client) machines. Files that have identical hashes to files already in the target device are not sent to the target and the target device creates appropriate internal references to the duplicated data. The benefit is avoiding transmission of redundant data across the network and thus reducing network traffic.

In some embodiments, deduplication is used with secondary storage systems, e.g., storage systems for primarily duplicate copies of data that are typically not used for actual production operations and thus exchange performance degradation for increased efficiency. Is some embodiments, deduplication finds use with primary storage when the backup system does not require significant overhead or impact performance.

Although the disclosure herein refers to certain illustrated embodiments, it is to be understood that these embodiments are presented by way of example and not by way of limitation. All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in computer science or related fields are intended to be within the scope of the following claims.

I claim:

1. A computer-implemented method for determining a first data block size for deduplicating a file type, the method comprising:
    constructing a function relating a plurality of compression ratios to a plurality of test data block sizes, wherein a compression ratio of the plurality of compression ratios is calculated by transforming a file of the file type using a deduplication technology and a test data block size of the plurality of test data block sizes;
    determining a maximum compression ratio of the function;
    choosing a test data block size associated with the maximum compression ratio to be the first data block size for the file type; and
    deduplicating a data block of the first data block size based on a sliding window, wherein deduplicating the data block comprises:
        calculating a first hash value to identify a potential data block; and
        calculating a second hash value to identify the duplicate data block,
        wherein a beginning of the sliding window is set at an end of a duplicate data block when the duplicate data block is detected, and wherein the sliding window moves backwards when the duplicate data block is not detected.

2. The computer-implemented method of claim 1 wherein constructing the function relating a plurality of compression ratios to a plurality of test data block sizes further comprises:
    providing a file of the file type, wherein the file has a file size;
    generating a plurality of data blocks from the file, wherein each data block of the plurality of data blocks has a size that is the test data block size;
    applying the deduplication technology to the plurality of data blocks to produce a deduplicated result file, wherein the deduplicated result file has a deduplicated size; and
    calculating a compression ratio from the file size and the deduplicated size.

3. The computer-implemented method of claim 1 wherein the file is selected from a collection of files of the same file type.

4. The computer-implemented method of claim 3 wherein the function is constructed using all files from the collection of files of the same file type.

5. The computer-implemented method of claim 1 wherein:
    the file comprises a plurality of data bytes; and
    the file type is determined by examining a data byte from the plurality of data bytes.

6. The computer-implemented method of claim 1 wherein:
    the file has an extension; and
    the file type is determined from the extension.

7. The computer-implemented method of claim 1 wherein the file type is selected from the group consisting of application, image, text file, source code, audio, video, database, spreadsheet, word processing document, system file, directory, disk image, archive, portable document, binary file, vector image, font, computer aided design, compressed, physical recordable media archiving, electronic design automation, desktop publishing, document, geographic information system, graphical information organizer, color palette, raster graphics, 3D graphics, mathematical, object code, shared library, dynamic linked library, page description, personal information manager, presentation, project management, reference management, scientific data, script, game, virtual machine, man file, webpage, markup language, and financial record.

8. The computer-implemented method of claim 1 wherein:
    the file has a resource fork; and
    the file type is determined from the resource fork.

9. The computer-implemented method of claim 1 wherein:
    the file has metadata; and
    the file type is determined from the metadata.

10. The computer-implemented method of claim 1 wherein the function is a model relating the plurality of compression ratios to the plurality of test data block sizes.

11. The computer-implemented method of claim 1 wherein the function is an interpolation based on the plurality of compression ratios and the plurality of test data block sizes.

12. A data backup system comprising:
- a table relating a plurality of file types to a plurality of selected data block sizes;
- a deduplication technology;
- a functionality to receive a data source having a file type; and
- a hardware processor configured to:
  - generate a plurality of data blocks from the data source, wherein each data block of the plurality of data blocks has a size that is the selected data block size associated with the file type; and
  - deduplicate a data block based on a sliding window wherein deduplicating the data block comprises:
    - calculating a first hash value to identify a potential data block; and
    - calculating a second hash value to identify the duplicate data block,
    - wherein a beginning of the sliding window is set at an end of a duplicate data block when the duplicate data block is detected, and wherein the sliding window moves backwards when the duplicate data block is not detected.

13. The data backup system of claim 12 further comprising a functionality to construct the table based on a function, wherein the hardware processor is further configured to:
- construct the function relating a plurality of compression ratios to a plurality of test data block sizes, wherein a compression ratio of the plurality of compression ratios is calculated by transforming a file of the file type using a deduplication technology and a test data block size of the plurality of test data block sizes.

14. The data backup system of claim 12 wherein the data source is a file.

15. The data backup system of claim 12 wherein the data source is a file system.

16. The data backup system of claim 12 wherein the data source comprises a plurality of files.

17. The data backup system of claim 16 wherein the plurality of files resides on a plurality of machines, computers, volumes, storage media, memories, locations, or network nodes.

18. The data backup system of claim 12 wherein the data backup system is local to the data source.

19. The data backup system of claim 12 wherein the data backup system is remote from the data source.

20. The data backup system of claim 12 further comprising a pre-populated plurality of data blocks generated from standard files of an operating system or file system.

* * * * *